United States Patent [19]
Park et al.

[11] Patent Number: 5,568,338
[45] Date of Patent: Oct. 22, 1996

[54] TAPE REWINDING MECHANISM FOR MAGNETIC RECORDING/REPRODUCING APPARATUS

[75] Inventors: Gun C. Park; Do Y. Choi; Young H. Cho, all of Suwon, Rep. of Korea

[73] Assignee: Samsung Electronics Co., Ltd., Kyungki-do, Rep. of Korea

[21] Appl. No.: 309,671

[22] Filed: Sep. 21, 1994

[30] Foreign Application Priority Data

Sep. 22, 1993 [KR] Rep. of Korea ............... 93-19262

[51] Int. Cl.⁶ ............................................. G11B 15/665
[52] U.S. Cl. .................................................. 360/85
[58] Field of Search ........................................ 360/85

[56] References Cited

U.S. PATENT DOCUMENTS

| | | | |
|---|---|---|---|
| 5,291,352 | 3/1994 | Nagasawa | 360/85 |
| 5,315,460 | 5/1994 | Takeda et al. | 360/85 |
| 5,327,306 | 7/1994 | Kondo et al. | 360/85 |
| 5,331,482 | 7/1994 | Takasaki et al. | 360/85 |

FOREIGN PATENT DOCUMENTS 93-21631  10/1993  WIPO.

*Primary Examiner*—Robert S. Tupper
*Attorney, Agent, or Firm*—Sughrue, Mion, Zinn, Macpeak & Seas

[57] ABSTRACT

A tape rewinding mechanism for a magnetic recording/reproducing apparatus is disclosed in which, when ejecting the tape from the deck, the reel with the tape installed thereon is driven by a capstan motor, so that the tape can be recovered with a proper tension maintained between the tape and the drum, thereby preventing damage to the tape. A driving gear is installed on a lever of a transmitting gear which is meshed with the capstan gear, and thus, the take-up reel is driven during loading, while the supply reel is driven during an unloading. During a reproduction, the take-up reel and the supply reel are easily driven by the transmitting gear, thereby simplifying the structure of the deck.

4 Claims, 6 Drawing Sheets

TAPE REWINDING MECHANISM FOR MAGNETIC RECORDING/REPRODUCING APPARATUS

BACKGROUND OF THE INVENTION

1. Field of the Invention

The present invention relates to a tape rewinding mechanism for a magnetic recording/reproducing apparatus, and more specifically, to a tape rewinding mechanism, in which, at the time of ejecting the tape from the tape deck, the tape reel that is wound with the tape is driven by a capstan motor, so that a proper tension is maintained between the tape and the drum, thereby preventing damage to the tape.

2. Description of the Prior Art

Many types of video tape recorders are currently known and used in various home electronics equipment. The most common tape recorders/reproducers use a ½-inch tape cassette. These magnetic recording/reproducing devices include: a cassette holder receiving a tape cassette; driving members for pulling the cassette holder into the body of the apparatus to place the cassette holder on a main deck; a loading system for loading or unloading the magnetic tape of the tape cassette to and from a rotary drum of the main deck; and a travelling system for making the tape run along a predetermined path.

Further, portable video cameras include the above type of magnetic recording/reproducing devices. Many such video cameras are compact and use an 8 mm tape cassette. One of the most influential factors in determining the compactness of a magnetic tape recorder/reproducer is the size of the tape deck. Basically, the success of reducing the size of a recorder/reproducer depends mostly on the reduction in size of the tape deck.

A recent trend has been towards small lightweight magnetic recording/reproducing devices, such as those which utilize the widely available 8 mm tape cassette. One such small, lightweight magnetic recording/reproducing device is disclosed in Published PCT Application WO9312163, (corresponding to Korean Patent Application 93-5016), which is incorporated herein by reference. As disclosed in the latter publication, the deck size is highly minimized in such a manner that a tape cassette is inserted into a cassette holder having a rotary drum to perform the first loading of a magnetic tape, and the cassette holder is then closed by being pressed to fully load the magnetic tape, wherein the rotary drum is completely held within an internal space of the tape cassette while the loading operation of the tape cassette is completed. According to this apparatus, power is supplied to the travelling system and loading system by means of a single capstan motor, thereby eliminating the need for two motors and reducing the size and weight of the tape deck.

A magnetic recorder/reproducer main deck of the type described in the above mentioned Published PCT Application is illustrated in FIGS. 1A through 1C herein, wherein there is shown a cassette 30 and a rotary drum 12 in various states of loading and unloading. The rotary drum 12 is installed on a main chassis 10. The tape cassette 30, with a tape 32 wound therein, is positioned on a pair of reel hubs on a sub-chassis 20. The sub-chassis 20 is adapted to move horizontally forward and backward on the main chassis 10 to bring the tape 32 into contact (loading) with the rotary drum (FIG. 1B) and to remove the tape 32 from contact with the rotary drum 12. When the tape is loaded, as in FIG. 1B, recording or reproducing operations may be performed.

FIG. 1A shows the condition of the elements mentioned when the tape is first loaded onto the sub-chassis. The tape 32 is presumed to be taut across the cassette opening. When the sub-chassis moves forward relative to the main chassis, the drum loosens the tape so as to cause it to surround the drum partially as shown in FIG. 1B. Subsequent to a recording or reproducing operation, when it is desired to eject the cassette, the sub-chassis is moved in the backward or reverse direction relative to the drum to "unload" the tape. However, as shown in FIG. 1C, this operation results in a loose portion of the tape existing in the cassette opening. Unfortunately, during ejection, the loosened portion of the tape 32 can become entangled with a lid or other components of the deck, causing damage to the tape.

One attempt to solve the latter problem is disclosed in Korean Patent Application (KPA) No. 93-14667. The latter KPA discloses a tape rewinding mechanism using a rack gear and an idler gear, which are shown in FIG. 2 herein. The elements are shown in FIG. 2 in the state just prior to moving the sub-chassis 20, with the tape cassette thereon, toward the main chassis 10. The tape cassette 30 is not shown for clarity of illustration.

As the user pushes the sub-chassis 20 toward the rotary drum 12, a sub-chassis moving mechanism (not shown) takes over and moves the sub-chassis 20 horizontally toward the rotary drum 12. A gear 40 on the sub-chassis is meshed with a rack 42 on the main chassis, resulting in the gear 40 rotating counter clockwise as the sub-chassis moves forward. The gear 44 rotates clockwise, and the gear 44 and the gear 46 rotates counter clockwise. The gear 46 meshes with supply reel 52, which rotates clockwise. The tape is loosened from the supply reel by the clockwise rotation, but is held taut on the drum when loading is completed.

During the horizontal movement of the sub-chassis 20, protuberances 8a and 49a of reel bases 48 and 49 come into engagement with stoppers 10a and 10b, respectively, on the main chassis 10, causing the reel bases to pivot around shafts 48b and 49b in the direction indicated by the arrows A. This pivoting causes the gear 46 to move out of engagement with gear 44. The axial shaft 44a of the gear 44 is positioned at the left portion of an elongate slot 48c of the reel base 48. Under this condition, a loading system (not shown, but including conventional elements, such as a pole base, a pinch arm, a pinch roller and review pole and the like) is activated to fully load the tape onto the drum, so that the reproducing/recording, rewinding, or fast forward operations can be carried out.

After a recording or reproduction operation, when the tape cassette is to be ejected, the loading system is activated so as to unload the tape. The sub-chassis 20 withdraws from the main chassis 10 in the horizontal direction, causing the protuberances 48a and 49a of the reel bases 48 and 49 to disengage from the stoppers 10a and 10b. As a result, the reel bases 48 and 49 pivot in the opposite direction from the arrow marks A due to the elastic force of the spring 50. Accordingly, the gear 44 engages the gear 46, and the movement of gear 40 along track 42 results in the supply reel 52 rotating in the counter clockwise direction to take up the slack of the tape to prevent the situation shown in FIG. 1C.

While the mechanism described solves the problem of loose tape during an eject operation, it does so at the cost of complexity. Namely, a rack has to be installed on the main chassis, and the reel base has to be provided with a plurality of gears. Not only does this complicate the construction of the deck, but it also increases the weight and bulk of the deck.

SUMMARY OF THE INVENTION

The present invention is intended to overcome the above described disadvantages.

It is the object of the present invention to provide a tape rewinding mechanism for a magnetic recording/reproducing apparatus, in which the power of a capstan motor for carrying out a loading and unloading operation is utilized, thereby eliminating the need for a separate rack and simplifying the constitution of and reducing the size of the deck.

The tape rewinding mechanism for a magnetic recording/ reproducing apparatus according to the present invention includes: a transmitting gear pivoted a certain angular amount around a shaft by being meshed with a capstan gear, the capstan gear being rotated forward and backward by a single driving source; a first gear meshed selectively with the transmitting gear for driving a loading system; a second gear for driving a travelling system; and an idler gear for receiving the rotational power of the second gear and for rotating a supply reel and a take-up reel. The mechanism according to the present invention further includes: a tape recovering means meshed with the transmitting gear and the second gear to drive the take-up reel during the loading of the tape and to drive the supply reel during the unloading of the tape, thereby recovering the magnetic tape loaded on a rotary drum.

The tape recovering means according to the present invention includes: a driving gear continuously meshed with the transmitting gear, but meshed with the second gear only during the loading and unloading of the tape to drive the second gear forward and backward; and a lever for connecting the transmitting gear to the driving gear, wherein the driving gear and the moving ranges of the transmitting gear are regulated in such a manner that the lower end portion of the axial shaft of the driving gear is guided within the range of a groove of the main chassis so as to cause the transmitting gear to be meshed with the first and second gears in a selective manner, and the driving gear is meshed with the second gear only during the loading and unloading of the tape.

BRIEF DESCRIPTION OF THE DRAWINGS

The above object and other advantages of the present invention will become more apparent from the following description of a preferred embodiment thereof with reference to the attached drawings in which.

DESCRIPTION OF THE PREFERRED EMBODIMENT

Figure 1A:
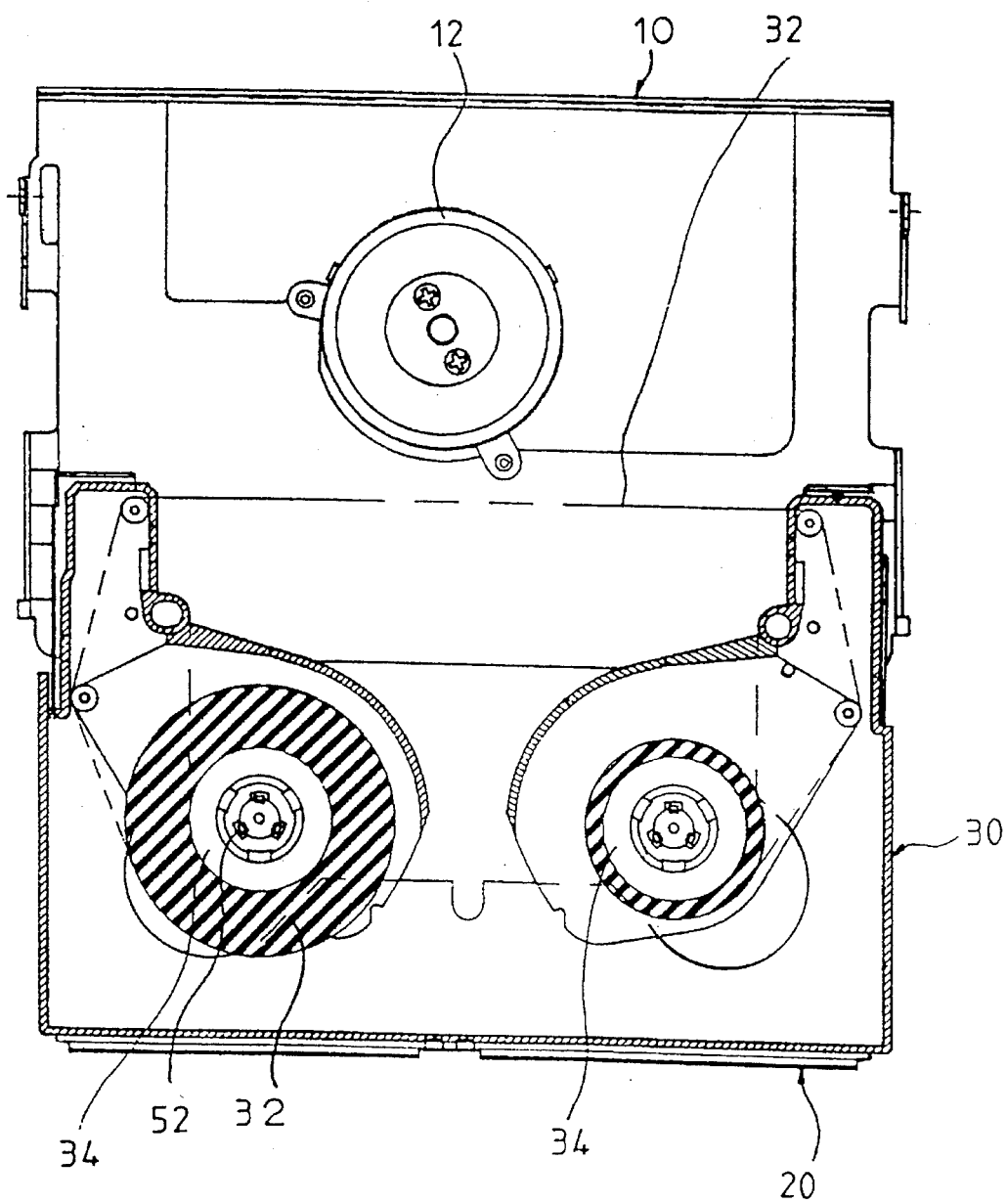
FIG. 1A is a schematic plan view of a conventional magnetic recording/reproducing apparatus in a state in which the tape cassette is initially placed on a sub-chassis.
Figure 1B:
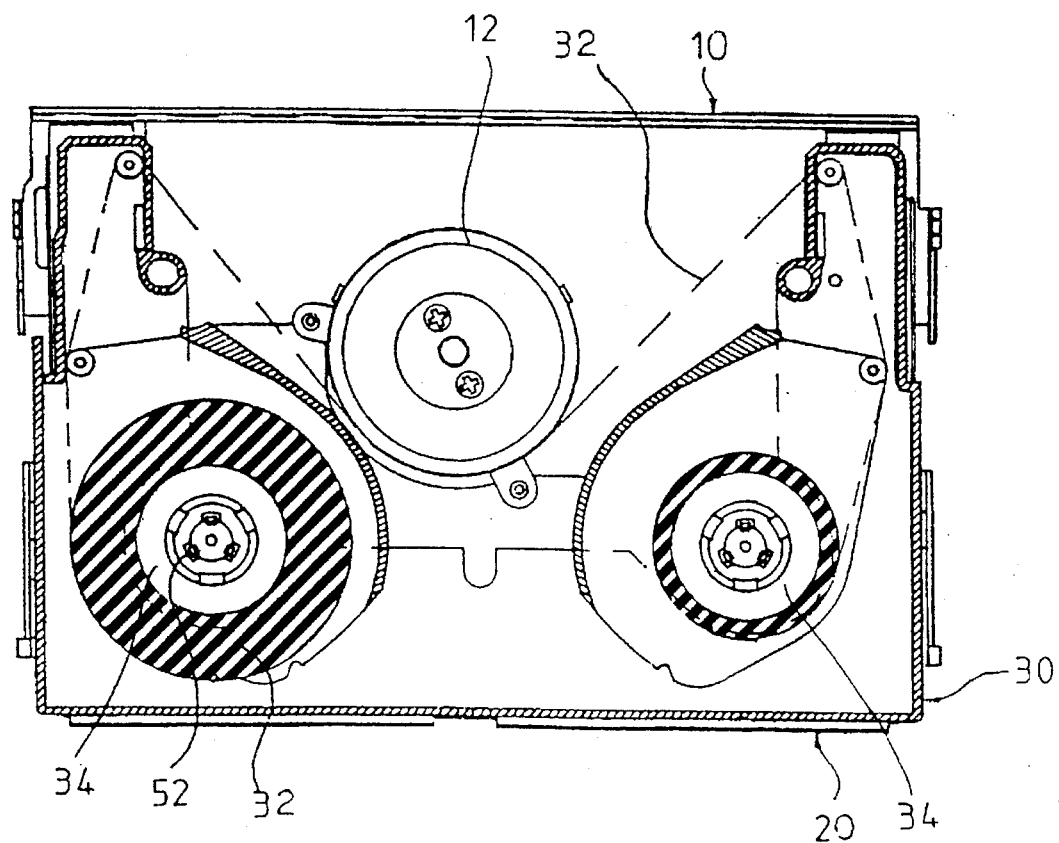
FIG. 1B is a schematic plan view of the device of FIG. 1A in a state in which the tape cassette is horizontally moved toward a rotary drum.
Figure 3:
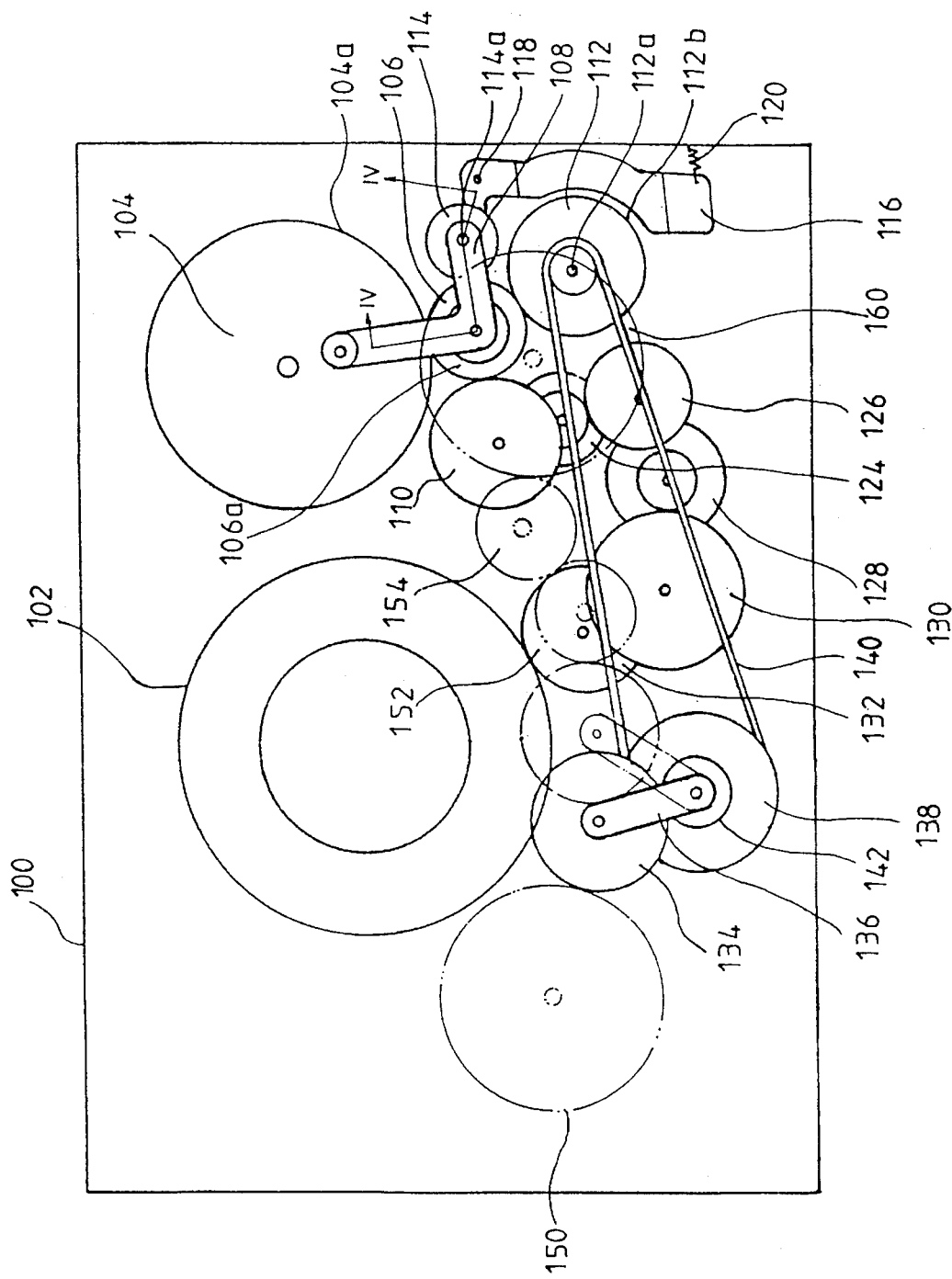
FIG. 3 is a plan view a tape rewinding mechanism according to a preferred embodiment of the present invention.
Figure 4:
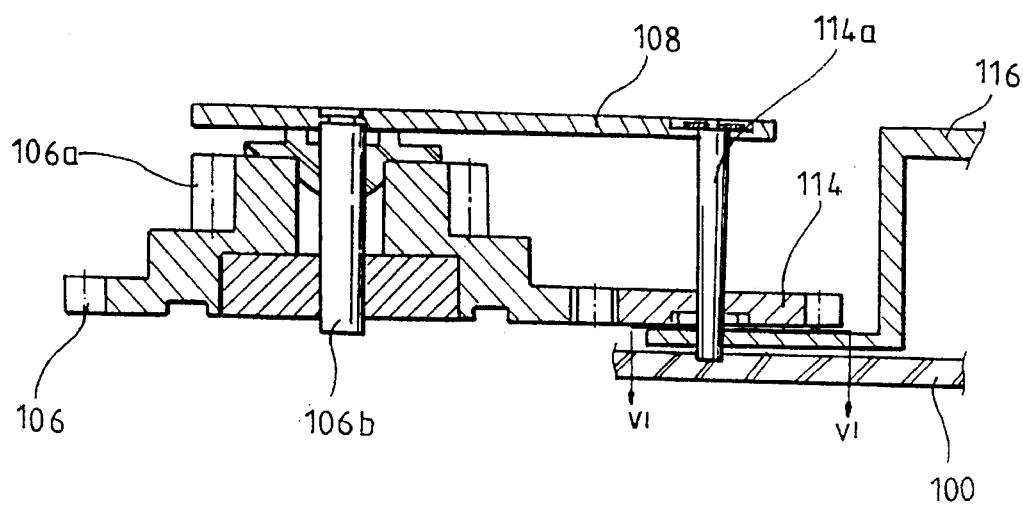
FIG. 4 is a sectional view taken along the line IV—IV of FIG. 3.

As shown in FIG. 3, a rotary drum 102 installed at the center of a main chassis 100 is provided with a head (not shown) which records or reproduces signals to or from the tape. A transmitting gear 106, which is meshed with a gear portion 104a of a motor 104, is mounted to rotate about a shaft 106b that is connected to a pivoting lever 108 (FIG. 4). The shaft 106b is located at the crook of the L shaped pivoting lever 108. One end of the pivoting lever 108 is anchored to the main chassis at a point which is shown in FIG. 1 over the motor 104. The lever 108 pivots about the latter anchor point. At the other end of lever 108 is a driving gear 114, which rotates about a shaft 114a and meshes continuously with driving gear 106. A first gear 110 and a second gear 112, for controlling the loading system and the travelling system, respectively, are positioned at opposite sides of the transmitting gear 106.

The transmitting gear 106, with extra teeth 106a (FIG. 4) rotates around the shaft 106b, which is attached to the lever 108. The lever 108 pivots about its upper end, which is attached to the chassis or the external non-rotating part of motor 104 to move the transmitting gear between the first gear 110 and the second gear 112. The first gear 110 receives the power from the capstan motor 104 through the transmitting gear 106, when gear 106 meshes with gear 110, and passes the power through a plurality of small gears 124–132 to a ring gear 102, to control the loading and unloading of the tape onto and from the rotary drum in a well known manner. The direction of rotation of the capstan motor, under this condition, determines whether a loading or an unloading operation takes place. Under this condition, teeth 106a of the transmitting gear 106 will be meshed with the first gear 110.

When the transmitting gear 106 engages the second gear 112, the power of the capstan motor causes rotation of the second gear 112, which in turn, rotates a driving pulley 112a provided with teeth 112b on the circumference thereof. The driving pulley 112a is connected through a belt 140 to a driven pulley 138, which is connected through an arm 136 to an idler gear 134. A gear portion 142 of the driven pulley 138 is meshed with the idler gear 134 to transmit the power of the capstan motor 104 either directly to a supply reel 150, or through auxiliary gears 152 and 154 to a take-up reel 160. Which of the reels is rotationally driven by the travelling system depends upon the direction of rotation of the capstan motor 4.

While the use of a single capstan motor to alternately drive the loading/unloading system and the tape travelling system is known in the above mentioned Published PCT Application, a novel feature of the present invention is the provision of the driving gear to control the tape travelling mechanism during the tape loading/unloading operations to thereby control the tightening of the tape during those operations.

The pivoting of the lever 108 is controlled by the plunger 116 and the capstan. When the plunger 116 is "activated" (i.e., in the state shown by the solid lines in FIG. 5), the lever 108 is held at a position where a protuberance 116a on the plunger 116 abuts shaft 114a of driving gear 114 and holds the lever 108 and gears 106 and 114 in place. Activation of the plunger is brought about by a permanent magnet on the bottom end of plunger 118 and an associated coil an the adjacent part of the chassis. An example of this arrangement is taught in the above Published PCT application. When a button (not shown) is pushed, the coil deenergizes and the force of spring 120 rotates plunger 118 counterclockwise. When this occurs, the protuberance 116a no longer blocks movement of lever 108. Thus, during this time, the rotational direction of the gear 106, which is caused by the rotational direction of the capstan gear 104, determines the movement of lever 108. Thereafter, the plunger 116 is again activated& and the plunger 116 rotates counterclockwise to bring the protuberance 116a back into a position which blocks movement of the lever 108. As a consequence, while the rotation direction of capstan 104 is used, during the inactive state of plunger 116, to determine whether gear 106 meshes with first gear 110 or second gear 112, during the active state of the plunger 116 the capstan motor can rotate in either direction without changing the meshing relationship of transmitting gear 106 and the gears 110 and 112.

Figure 6:
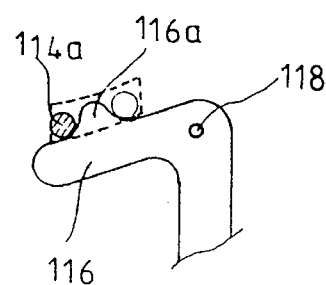
FIG. 6 is a sectional view taken along the line VI—VI of FIG. 4.

FIG. 6 shows the position of the shaft 114a in the two positions where it and lever 108 are "locked" in position by the plunger 116 and protuberance 116a. The solid circle 114a represents the position of lever 106 when transmitting gear 106 is in mesh with first gear 110. The phantom circle represents the position of shaft 114a when the lever 108 is locked in a position where the transmitting gear 106 is meshed with second gear 112. Rotation of the plunger 116 counterclockwise removes the protuberance 116a from a position which blocks shaft 114a, and thus, during this inactive state of plunger 116, the shaft may move between the two positions shown in FIG. 6.

A permanent magnet (not shown) is attached to the tip of the plunger, and the plunger 116 is actuated by a driving coil (not shown) and the permanent magnet in a conventional manner, such as described in the above mentioned Published PCT Application, to cause the plunger to pivot in a clockwise direction about pivot point 118 against the bias of spring 120. The movement range of the shaft 114a is regulated by a groove 122 in the main chassis 100.

Figure 5:
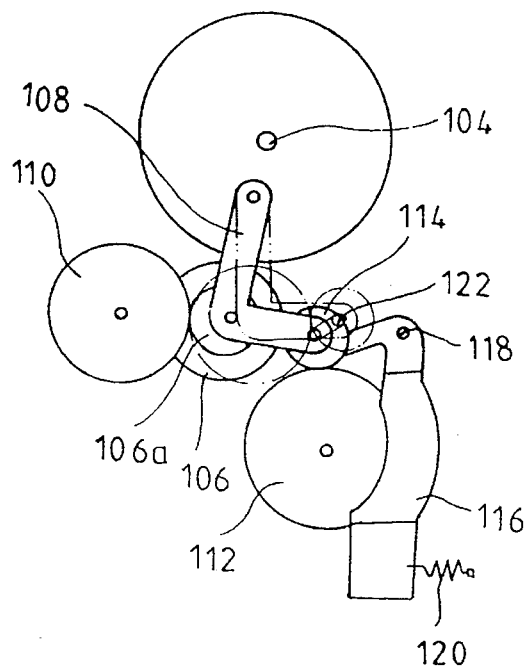
FIG. 5 is a plan view of a critical portion of the tape rewinding mechanism of FIG. 3.

As shown in detail in FIGS. 4, 5 and 6, the pivoting lever 108 is coupled with the top of the revolution shaft 106b of the transmitting gear 106, while the axial shaft 114a of the driving gear 114 is rotatably installed on the tip portion of the pivoting lever 108. The lower portion of the shaft 114a is inserted into the groove 122 of the main chassis 100, so that the movement range of the shaft 114a is controlled.

Figure 1C:
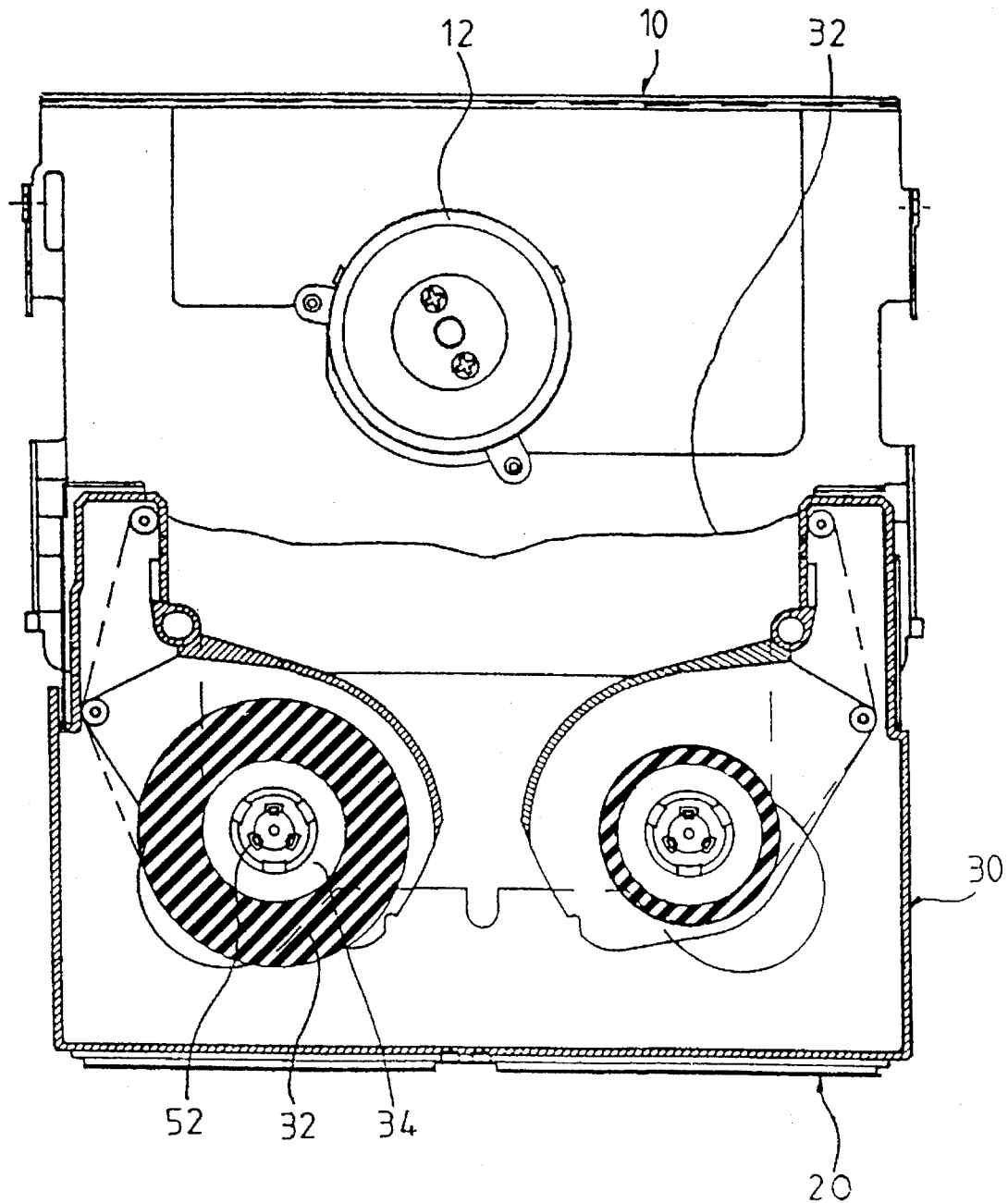
FIG. 1C is a schematic plan view of the device of FIG. 1A in a state after the tape cassette is moved away from the rotary drum.
Figure 2:
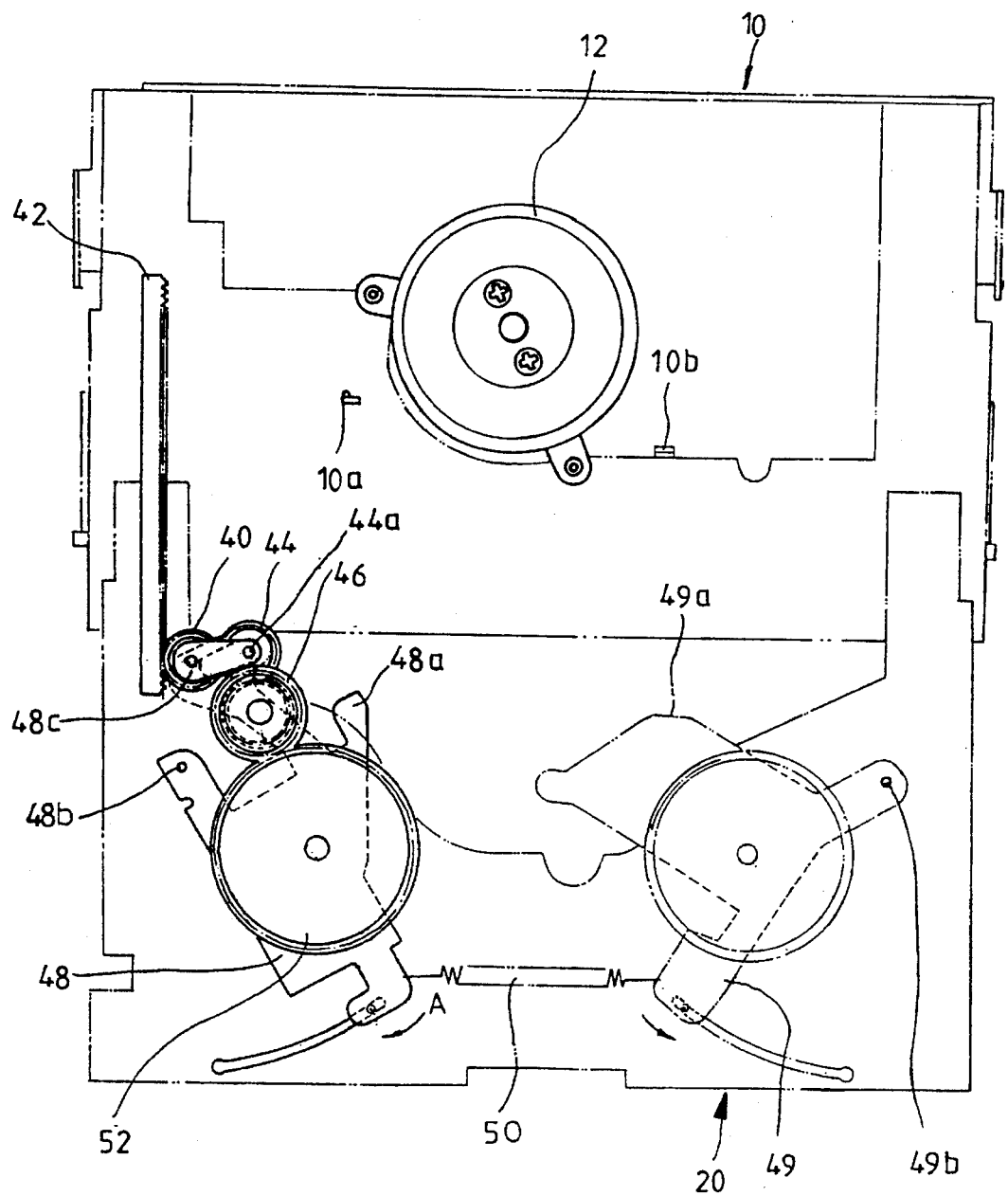
FIG. 2 is a schematic plan view of a tape rewinding mechanism for a magnetic recording/reproducing apparatus.

The gear 114, which rotates about shaft 114a and which is always meshed with the gear 106, serves to control tape winding during the unloading operation to prevent the condition shown in FIG. 1C. The gear 114 is out of engagement with gear 112 whenever the gear 106 engages gear 112, so that the former does not interfere with the normal tape running operation. However, when the lever 108 is in the position shown by the solid lines in FIG. 5, (i.e., when the capstan motor is controlling the loading and unloading operations and gear 106 engages gear 110), the lever 108 brings gear 114 into engagement with the gear 112 that controls tape travelling. As a result, during loading and unloading, even though gear 106 does not contact gear 112, nevertheless the gear 114, which is driven by gear 106, controls gear 112 to control tape tautness during unloading and loading.

During the loading of a tape, when the gear 110 is controlled by the capstan through the transmitting gear 106, the capstan motor 104 is caused to rotate in a counter clockwise direction. Power is transmitted through small gears 124, 126, 128, 130 and 132 to the ring gear 102 to rotate it counter clockwise. When the ring gear 102 rotates counter clockwise, standard items, not shown in the drawings, but including a pole base, a middle pole, and a review pole are activated to load the tape onto the rotary drum. At this time, the driving gear 114, which is meshed with the second gear 112, causes clockwise rotation thereof. This in turn causes the clockwise rotation of the belt 140 and the driven pulley 138. Therefore, the idler gear 134, which is installed on the end of the arm 136, pivots clockwise to mesh with the auxiliary gear 152. The auxiliary gear 152 drives the take-up reel 160 through another auxiliary gear 154. This action keeps the tape taut even though the tape loading mechanism loosens the tape to place it in the proper position around the drum.

When the tape is loaded, it becomes necessary to remove the power of the capstan motor from the loading system and provide it fully to the tape travelling system. In this case, the positional regulation of the transmitting gear 106 has to be released. Under this condition, the plunger 116 is deactivated by pressing a button (not shown). This results in deenergization of the driving coil (not shown) and the plunger 116 is pulled in a counterclockwise direction by the force of spring 120. The protuberance 116a therefore no longer blocks movement of shaft 114a and the associated lever 108. At this time the capstan motor will rotate briefly in the clockwise direction. This causes transmitting gear 106 to rotate counterclockwise. The counterclockwise rotation of transmitting gear 106, which is in mesh with gear 104, causes gear 106, lever 108, and gear 114 to pivot to the right as shaft 114a moves to the right along groove 122. The plunger 116 is again activated by energizing the coil, thereby causing the plunger to rotate clockwise and effectively lock the gears 106 and 114 in the position where gear 106 meshes with second gear 112 and where gear 114 does not mesh with any gear other than gear 106. This is the position shown by the phantom lines in FIG. 5. In this state, the supply reel 150 or the take-up reel 160 is driven as described above depending on the revolution direction of the capstan motor 104. Thus recording/reproduction, fast forward or rewinding of the tape can be carried out.

For an unloading operation, the plunger 116 is again deactivated to cause it to pivot counterclockwise under the influence of the spring 120. The protuberance 116a moves out of the locking position shown in FIG. 6. The capstan motor rotates counterclockwise causing the transmitting gear 106 to rotate clockwise, thereby moving gears 106 and 114 and lever 108 to the left. Transmitting gear 106 then disengages with second gear 112 and meshes with first gear 110, and driving gear 114 meshes with second gear 112. The plunger is then activated to lock the lever 108 and gears 106 and 114 in this position (shown by the solid lines in FIG. 5). The capstan motor 104 is then rotated clockwise, causing the transmitting gear 106 to rotate counter clockwise and the first gear 110 to rotate clockwise. When the first gear 110 rotates clockwise, the revolution power is transmitted through the group of the small gears to the ring gear 102 so as to rotate the ring gear 102 clockwise. Consequently, the pole base (not shown) and the like are operated in a known manner to unload the tape from the drum. During such an unloading operation, contrary to the situation shown in FIG. 1C, the magnetic tape is not loosened but is made tight. This will be described below.

During the clockwise revolution of the capstan motor 104, the transmitting gear 104 is meshed with the first gear, while the driving gear 114 is meshed with the second gear 112.

Therefore, when the first gear 110 rotates clockwise, the second gear 112 is made to rotate counter clockwise by the driving gear 114, so that the driven pulley 138 should be made to rotate counter clockwise by the belt 140. When the driven pulley 138 is made to rotate counter clockwise, the idler gear 134, which is installed on the end of the arm 136, is meshed with the gear 142 so as to rotate clockwise, and at the same time, the supply reel 150 rotates counter clockwise. When the supply reel 150 rotates counter clockwise, the magnetic tape, which can otherwise be loosened during the unloading operation as shown in FIG. 1C, is automatically recovered to be put in a taut state.

Consequently, during the unloading operation, the driving gear 114 is meshed with the second gear to rotate the driven pulley 138, so that the idler gear 134 rotates the supply reel 150 counter clockwise. Consequently, the magnetic tape is rewound on the supply reel 150 without being loosened, so that the tape will not become entangled by the cassette lid or other deck components, thereby preventing damage to the tape.

According to the present invention as described above, the driving gear is installed in such a manner as to mesh with the transmitting gear in a simple manner, and thus, when the loading system is activated, the travelling system is also activated, so that the magnetic tape can be automatically recovered.

What is claimed is:

1. In a magnetic recording/reproducing apparatus of the type having, a capstan gear rotatable in a forward and reverse directions, a first gear for driving a loading system of said apparatus, a second gear for driving a tape travelling system of said apparatus, an idler gear for receiving the revolution power of said second gear for rotating a supply reel and a take up reel selectively of said apparatus, and a transmitting gear selectively swingable between said first and second gears and meshed with said capstan gear for selectively transmitting the power of said capstan gear to said first gear or said second gear, the improvement comprising:

a driving gear meshed with said transmitting gear all the time, but meshed with said second gear only during the loading and unloading of the tape to drive said second gear forward and backward; and a lever for connecting said transmitting gear to said driving gear, and moving range regulating means for controlling the moving ranges of said transmitting gear and driving gear in such a manner that the transmitting gear is guided to mesh with said first and second gears in a selective manner, and said driving gear is meshed with said second gear only during the loading and unloading of the tape.

2. In a magnetic recording/reproducing apparatus of the type having, a capstan gear rotatable in a forward and reverse directions, a first gear for driving a loading system of said apparatus, a second gear for driving a tape travelling system of said apparatus, an idler gear for receiving the revolution power of said second gear for rotating a supply reel and a take up reel selectively of said apparatus, and a transmitting gear selectively swingable between said first and second gears and meshed with said capstan gear for selectively transmitting the power of said capstan gear to said first gear or said second gear, the improvement comprising:

a driving gear and a driving gear shaft about which said driving gear rotates;

a lever connected to said shaft of said driving gear and to a shaft about which said transmitting gear rotates; said driving gear and transmitting gear shafts being connected to said lever is such a manner that said transmitting and driving gears mesh; said lever being attached pivotally to a main chassis of said apparatus; and plunger means operative in cooperation with said capstan gear and said lever to control the pivoting of said lever between a first position where said transmitting gear meshes with said first gear and said driving gear meshes with said second gear, and a second position where said transmitting gear meshes with said second gear and said driving gear does not mesh with either said first or second gears;

whereby said driving gear controls the tightening of said tape through said second gear and supply and take up reels during loading and unloading of said tape.

3. The apparatus of claim 2, further comprising a groove in said chassis into which one end of said driving gear shaft is fitted for guiding said driving gear in its movements as said lever is pivoted.

4. The apparatus of claim 2, wherein said plunger means comprises a plunger pivotable about a pivot point, a spring connected between said plunger and said chassis to bias said plunger in one direction, and electromagnetic means to control pivoting of said plunger against the bias of said spring, and a protuberance on said plunger; said plunger and protuberance being positioned to abut said driving gear shaft to hold said lever in said first position or said second position when under the influence of said spring, and to free the lever for movement to the other of said first and second positions when electromagnetically operated to pivot against the force of said spring.

* * * * *